United States Patent Office 2,862,348
Patented Dec. 2, 1958

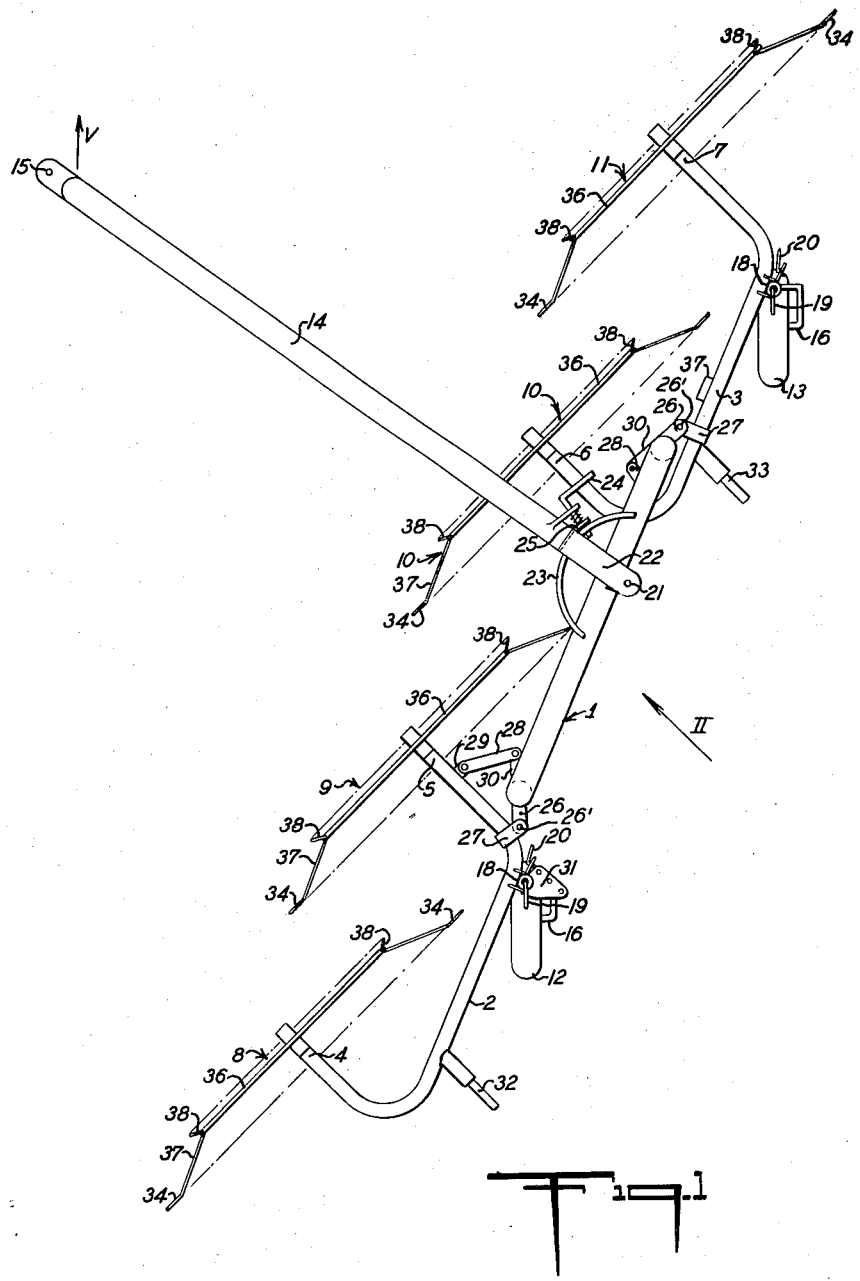

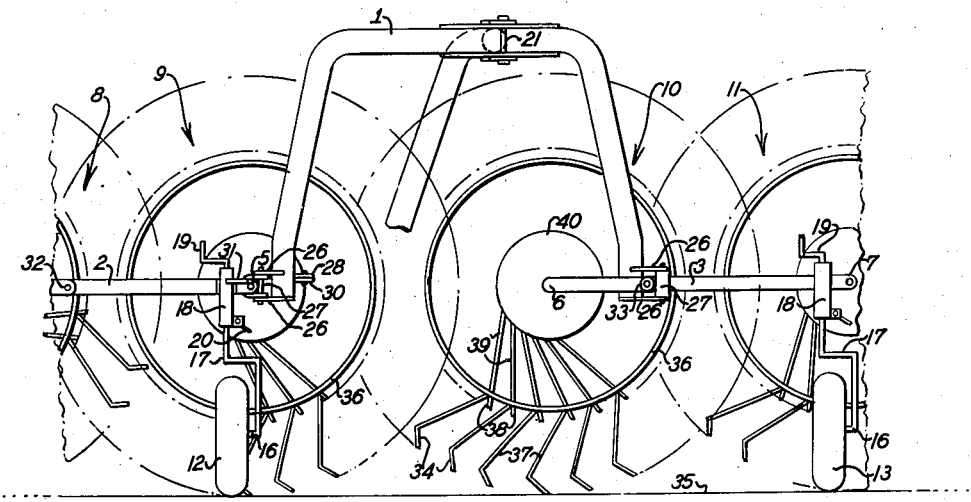

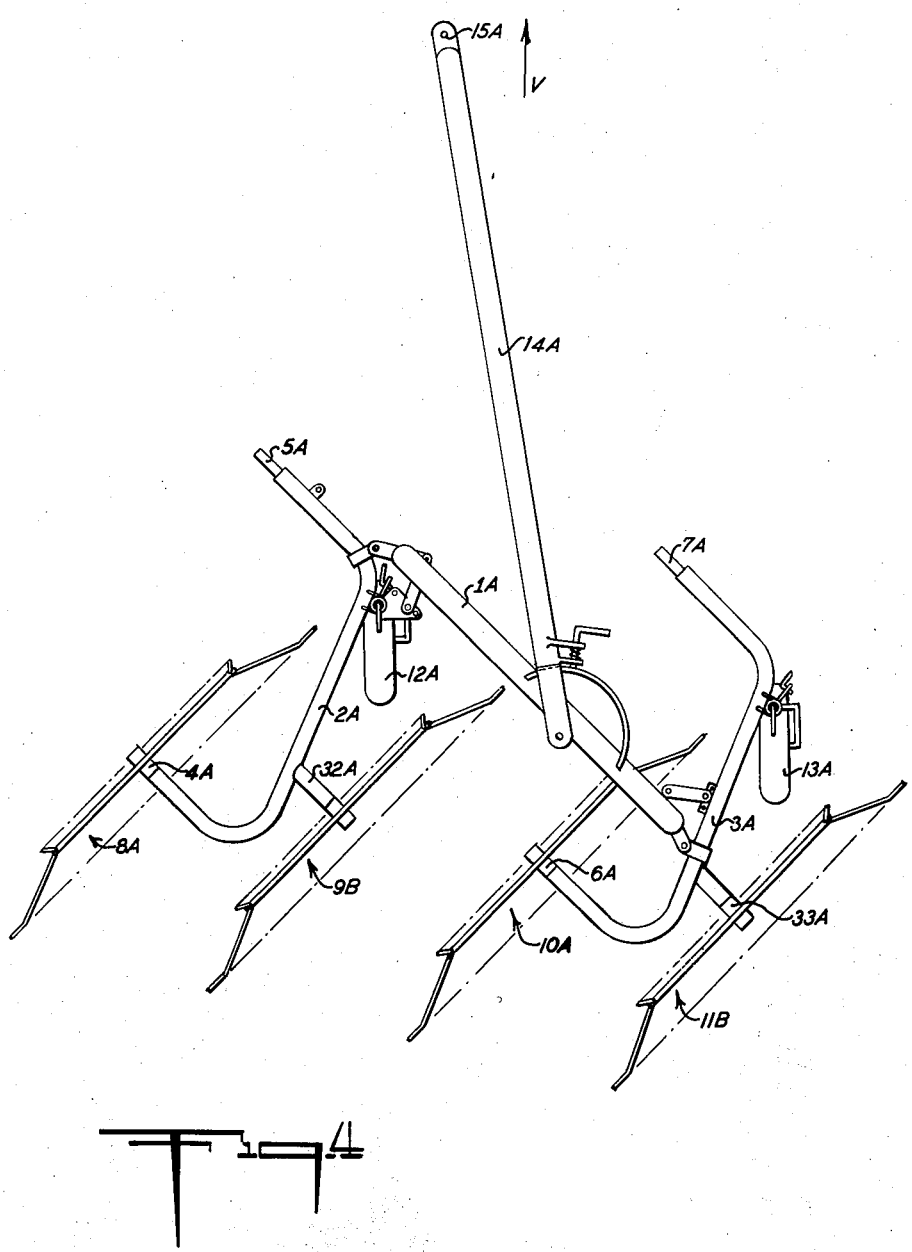

2,862,348

SIDE DELIVERY RAKING DEVICE

Cornelis van der Lely and Ary van der Lely, Maasland, Netherlands, assignors to C. van der Lely N. V., Manufacturers, a Dutch limited company of Netherlands Application August 9, 1955, Serial No. 527,397

Claims priority, application Netherlands August 10, 1954

8 Claims. (Cl. 56—377)

The invention relates to devices for laterally displacing material lying on the ground.

The invention contemplates the use of a number of rotatable rake wheels or the like arranged on supports in such a manner that the device can function as a swath turner which is convertible to use as a tedder or side delivery rake.

It is an object of the invention to provide a device which can be very simply changed from a swath turner to a device for treating strips of ground cooperatively or separately.

Further objects and advantages of the invention will be hereinafter more fully described with reference to the accompanying drawings in which a preferred embodiment of the invention is illustrated by way of example and in which:

Fig. 1 is a plan view of a device provided in accordance with the invention and used as a side delivery rake, Fig. 2 is a side view of the same device used as a side delivery rake, viewed from the direction of the arrow II in Fig. 1, Fig. 3 is a plan view of the same device as a swath turner, Fig. 4 is a plan view of the same device arranged for a separate treatment of adjacent strips of ground.

According to Figs. 1 and 2, the device consists of a vertical yoke or mobile coupling frame 1 in elongated form and two horizontal yokes or intermediate auxiliary frames or supports 2 and 3 which are provided with integral axles 4, 5, 6 and 7 for rotary raking members 8, 9, 10 and 11. The supports are supported for ground traversing movement by running wheels 12 and 13 and a draw-arm or draw-bar 14 is connected to the uppermost part of the main frame 1.

The foremost extremity of draw arm 14 is provided with an eye 15 for connection to a tractor or the like. Each of the horizontal axles 16 of the running wheels 12 and 13 are integral with a vertical shaft 17 which is rotatable in a vertical bearing tube 18.

One of the bearings 18 is rigidly connected to the intermediate frame 2 and the other to the intermediate frame 3. Each of the bearings 18 is provided with a crank 19 the crank shaft of which can be threadably adjusted in the bearing 18 for adjustment of the distance between the frame and the ground and thereby between the raking members 8—11 and the ground to a desired value. Each tube 18 includes a conventional clamping means (such as that shown in the Enos patent 2,680,343) for clamping the axle 17 and its associated running wheel in a fixed position. Preferably, however, the running wheel 13 operates as a self-adjusting running wheel when the device is used as a side delivery rake.

By means of a vertical hinge pin 21, the main frame 1 is hingedly connected to a fork 22 which constitutes the rearmost end of the arched arm 14. The fork not only engages the coupling frame 1, but also a bent strip 23 provided with a series of holes (not shown), said strip 23 being welded to said tube.

A locking pin 24 inserted through holes (not shown) in lips 25 on the arm 14 can be selectively inserted in the holes in the strip 23 (a conventional structure for locking two relatively movable parts can be found in Enos Pat. No. 2,680,343 of June 8, 1954). Thus, the arm can be secured in various positions against displacement.

The main frame 1, including limbs extending downwardly, carries at its lower extremities two perforated lips 26 whereas each of the intermediate frames 2 and 3 carries a fastening member 27 which can be connected to the lips 26 by means of a vertical hinge pin 26'. Bars 28 keep the intermediate frames 2 and 3 in fixed position with regard to the coupling frame 1 by connecting projections 29 rigidly fixed to the intermediate frames 2 and 3. Bars 28 are detachably coupled to projections 30 rigidly fixed on the main frame 1. Projections 31 are rigidly fixed to the intermediate frames 2 and 3 to which the bars 28 are detachably connected if not connected to the projections 29.

Further, the intermediate frames 2 and 3, respectively, are provided with bearings 32 and 33 on which a raking member of the same shape as the raking members 8—11 can be mounted. Each rake wheel mounted on any of the bearings 4—7, 32 or 33, is freely rotatable, the axes of rotation for all bearings on the same intermediate frame always being parallel.

It will be evident that when the device in Fig. 1 is moved in the direction of the arrow V over the ground on which crop is spread, the raking members 8—11 contact the ground 35 with the lowermost extremes of their circumferential teeth 34. The wheels, thus, will move along the ground with a partly rotating and partly sliding motion and, while doing so, they will shift the crop lying on the ground to the left. The material removed by the raking member 11 is fed to the raking member 10 and, in turn, to the raking member 9, and so forth so that all material is discharged at the left side of the rake wheel 8.

Preferably, the teeth 34 of the raking members are formed as the bent extremities of bars 37 which extend through holes (not shown) in a rim 36. Short teeth 38, extending forward, are placed on the rim 36. The bars 37 are extensions of spokes 39 provided for the rim 36 which spokes are rigidly connected to a central disc 40. The bars 37 can rotate about the center line of a spoke 39 out of the wheel plane so that the teeth 34 are able to adapt themselves readily to irregularities of the ground. While so rotating, the spokes 39 are somewhat subject to torsion, so that the teeth will tend to resume their original position. It is preferred that the bars 37 are not positioned in a flat, common plane, but instead cross the axis of rotation of the associated raking member at an acute angle.

The special construction of the raking members makes it unnecessary to fasten the bearings to the intermediate frames 2 and 3 so that they can be moved up and down, but they may be rigidly fixed which simplifies the construction of the frame greatly. The teeth 38 which are located closest to the axis of rotation and further toward the front, deliver the greater part of the accumulated material laterally.

The device described can be simply modified to or from a swath turner as is shown in Fig. 3 wherein parts corresponding to parts in Figs. 1 and 2 are designated with an A. In the swath turner arrangement, the arm 14A is secured in a different position with regard to the main frame 1A, the intermediate frames also having different positions. In their new positions, the intermediate frames 2A and 3A are locked by means of the bars 28A. When the device is pulled forward in said position in the direction of arrow V by a force applied at point 15A, the device operates as a swath turner.

It will be noted that when acting as a swath turner, the mobile frame 1A supports the rotary raking members 8A—11A by the raking member supports 2A and 3A in such a manner that the rotary raking members are arranged in parallel groups transvese to the frame.

A third possibility of use appears in Fig. 4 wherein the parts of the frame are in the same position as in Fig. 3 except that the raking members 9A and 10A are removed from the bearings 5A and 7A and mounted as members 9B and 11B on bearings 32A and 33A. Thus, the four raking members lie in two rows transverse to supports 2A and 3A wherein they are equally spaced when measured transverse to the travelling direction. Every raking member displaces the material on the ground only for a very small distance and this material is not successively displaced by means of another raking member. The device thus treats adjacent strips separately when traveling in the direction of the arrow V in Fig. 4. In the arrangement according to Fig. 4, the device is also very suitable for weeding operations.

It will be noted that the device described has at least two groups of rake wheels extending from the extremities of a vertical yoke, this principle being subject to modification within the scope of the invention without departing therefrom.

Furthermore the invention can also be applied to devices in which the groups of bearers, at least seen from above, have a practical fixed place in the frame, the corresponding raking members of one single group of said groups of bearers treating always one single swath when using the device as a turner, as described in the British patent specification 680,537. In this case in any of the groups a number of additional bearers are mounted which are arranged in one row with bearers for the raking members of this group which are provided with raking members while turning swaths. In that case raking members which are removed from other groups can be mounted on the bearers in question so as to obtain a side delivery rake.

The construction described in which every time a number of bearers for the raking members is fixedly mounted on a frame has the advantage to be very simple. It will be evident, however, that the invention can also be applied in the case that a number of said bearers or all bearers are mounted in such a way that they can displace themselves in a substantially vertical direction, e. g. mounted on cranks.

What we claim is:

1. A device for laterally displacing material lying on the ground, comprising a draw-bar means, an elongated main frame adjustably pivoted to an end portion of said draw-bar means, an elongated auxiliary frame adjustably pivoted to each end portion of said main frame, and at least one rotary raking member operatively associated with each of said auxiliary frames, whereby said frames may be adjusted with respect to each other to provide at least two raking effects.

2. A device as claimed in claim 1 comprising a plurality of rotary raking members operatively associated with each of said auxiliary frames and bearings coupling said rotary raking members in rows transverse to said auxiliary frames for tedding operations.

3. A device as claimed in claim 1 comprising locking means operatively associated with said main frame for locking said draw-bar means relatively to said main frame.

4. A device as claimed in claim 1 comprising pivot means coupling said auxiliary and main frames whereby said rotary raking members can be aligned in a row.

5. A device as claimed in claim 1 wherein said auxiliary frames are horizontal yokes, said main frame including a vertical yoke coupled at its extremes to said horizontal yoke, said vertical yoke being of greater height than said rotary raking members.

6. A device as claimed in claim 1 comprising running wheels operatively associated with said auxiliary frames for ground traversing movement.

7. A device as claimed in claim 1 wherein said draw-bar means includes an arched portion of greater height than said rotary raking members for extending over the same.

8. A device as claimed in claim 1 wherein said rotary raking members are freely rotatable rake wheels which are rotated by contact with the ground and material lying thereupon.

References Cited in the file of this patent

UNITED STATES PATENTS 2,680,343     Enos _____ June 8, 1954

FOREIGN PATENTS 680,537     Great Britain _____ Oct. 8, 1952